Oct. 5, 1954  R. C. L. LUCAS  2,690,668
ROAD ADHESION INDICATOR FOR AUTOMOTIVE VEHICLES
Filed Nov. 6, 1950  6 Sheets-Sheet 1

Inventor
R. C. L. Lucas

Oct. 5, 1954  R. C. L. LUCAS  2,690,668
ROAD ADHESION INDICATOR FOR AUTOMOTIVE VEHICLES
Filed Nov. 6, 1950   6 Sheets-Sheet 6

Inventor
R. C. L. Lucas
Attys.

Patented Oct. 5, 1954

2,690,668

UNITED STATES PATENT OFFICE 2,690,668

ROAD ADHESION INDICATOR FOR AUTOMOTIVE VEHICLES

Robert Charles Louis Lucas, Paris, France

Application November 6, 1950, Serial No. 194,201

Claims priority, application France April 27, 1949

15 Claims. (Cl. 73—9)

This patent application is a continuation in part of my earlier U. S. patent application Serial No. 121,758 filed on October 17, 1949, for "Adherence Indicating Instrument for Use on Motorcars," and now abandoned, and certain parts of the present application will be found in the earlier application.

This invention relates to an apparatus adapted to indicate whether the wheels of an automotive vehicle are about to skid or whether a skid is likely to occur on account of insufficient adhesion of the wheels to the road surface.

Adhesion indicators have already been designed wherein a rolling member mounted on a substantially horizontal fork member pivotally mounted about a vertical shaft fast with the vehicle determines the conditions of adhesion existing at any time by measuring the transverse stresses which should be applied to this rolling member in order to deviate it, through rotation about this shaft, from a line parallel with the direction of travel of the vehicle.

The first object of this invention is to provide, in an adhesion indicator of the type comprising a rolling member acting as a feeler and carried by a substantially horizontal fork member pivotally mounted on a vertical shaft fast with the vehicle, means for applying to this rolling member a torque about the axis of the vertical shaft, and either the continuous indication of the angular distance existing between the actual position of this rolling member submitted to this torque and a predetermined position thereof about the aforesaid axis, or the instantaneous indication that this rolling member is displaced angularly from a predetermined position about the vertical axis.

Another object of the invention is to provide, in an adhesion indicator of the kind broadly described hereinabove, a member resiliently connected to the rolling member for producing a torque, the relative angular position varying with the speed of the vehicle, the rolling member moving in a direction parallel with that of the vehicle and being urged towards a skid position by this torque when the adhesion of the wheel becomes insufficient to counteract this torque, this skid causing the actuation of a visual or audible warning signal.

The accompanying drawings forming part of this specification illustrate diagrammatically different practical embodiments of the invention given solely by way of example in order to facilitate the understanding of the various objects of the invention as broadly set forth hereinabove.

Figures 1, 2, 4:
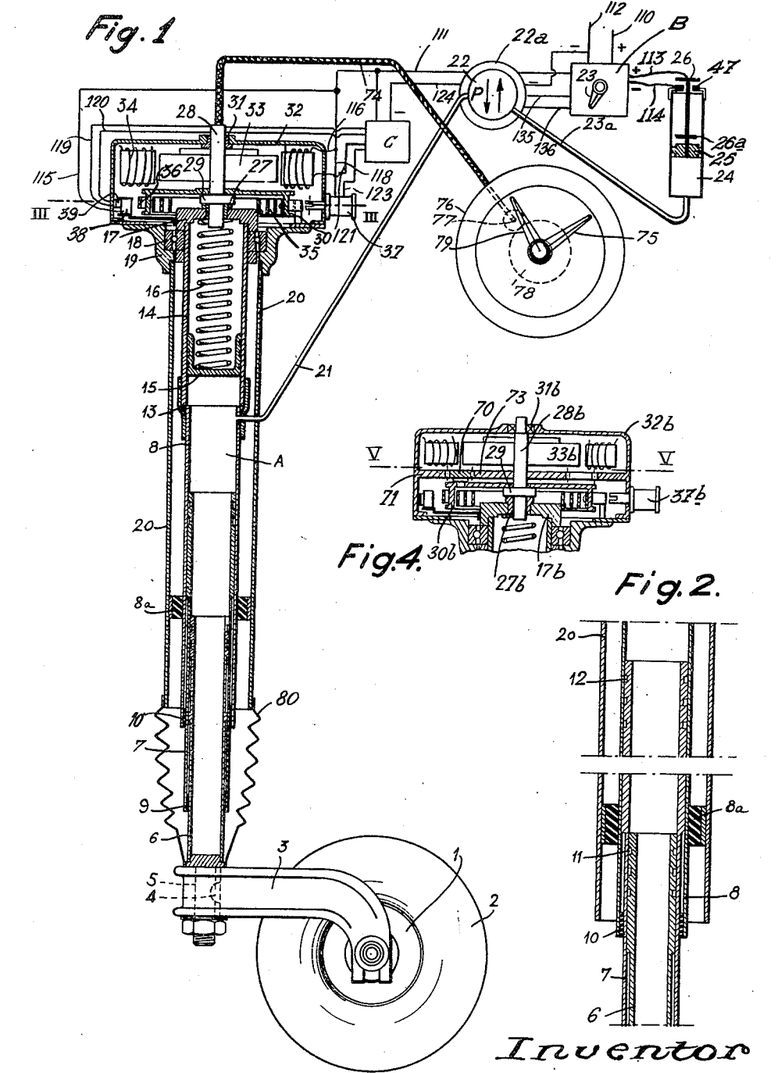
Fig. 1 is a vertical axial section of the adhesion indicator, including the feeding circuits and direct reading member thereof.
Fig. 2 shows in axial section and at a greater scale a detail of the device of Fig. 1.
Fig. 4 is a modified embodiment of the torque generating device located in the upper portion of the adhesion indicator illustrated in Fig. 1.
Figure 3:
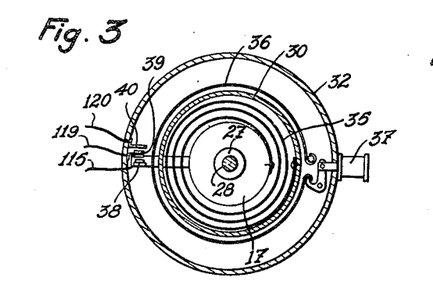
Fig. 3 is a section of Fig. 1 taken along line III—III.
Figures 12, 13:
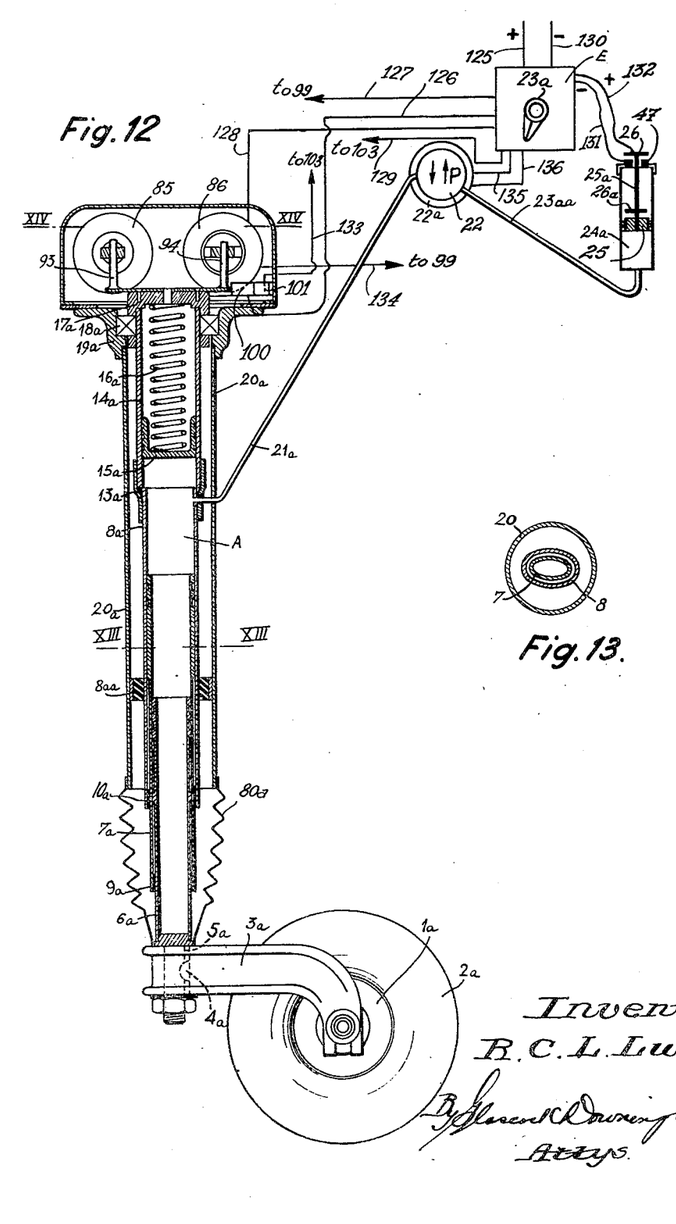
Fig. 12 is a vertical axial section of a modified adhesion indicator according to the invention.
Fig. 13 is a cross-sectional view along the line XIII—XIII of Fig. 12.

Referring now to the apparatus shown in Figs. 1 and 3 the adhesion indicator according to the invention comprises a wheel 1 mounted on ball-bearings and fitted with a special tire 2 having preferably an outer diameter of about 7½ in. The wheel 1 is carried by a lightweight fork 3, for instance of cast aluminium, keyed at 4 on the endpiece 5 of a tube 6 forming the inner tube member of the body of the apparatus. The tubular member 6 is a sliding fit in another tube 7 which in turn is slidably fitted in a further tube 8 so as to form a telescopic assembly. Preferably these tubes are made of suitable steel material and have an oval cross-section as illustrated in Fig. 13 in order to prevent them from rotating in relation to each other. The lower ends of tubes 7, 8 are provided with spacer rings 9, 10, respectively, acting as lower guiding means for these tubes. The upper portions of tubes 6, 7 are provided with packing rings 11, 12, respectively, for instance of rubber material. The outer tube 8 is connected through a welded socket member 13 with a circular-sectioned tube 14 having slidably mounted therein a piston member 15 urged downwards by a coil spring 16. This tube 14 has its upper end closed by a screw-threaded cap 17 formed with a central bore and adapted to keep in position a ball bearing 18 interposed between the tube 14 and a flanged sleeve member 19 fixed to the upper end of a further tube 20 forming the external casing or body of the apparatus. The cap member 17 also forms a rest member for the spring 16. In addition, a spacer ring 8a is fitted between casing 20 and tube 8.

This construction provides a cavity A formed between piston 15, tubes 14, 8, 7 and 6, and endpiece 5; this cavity is connected through a pipe 21 to a pump 22 driven by an electromotor 22a (Figs. 9, 10) which is started by actuating a general control knob 23. This pump 22 is connected through a pipe 23a to a reservoir 24. Thus, when the pump feeding circuit is energized by actuating the knob 23, pump 22 draws a fluid, for instance oil, from the reservoir 24 and delivers it into the cavity or chamber A thereby causing tubes 7, 6—and therefore the wheel assembly 1, 2, 3 fast with tube 6 through endpiece 5—to move downwards. When the tire 2 engages the ground the oil pressure in chamber A tends to lift piston 15 and spring 16 is compressed. This pressure causes the wheel to be strongly applied against the ground and acts upon the wheel somewhat in the manner of the suspension springs of the car upon the wheels thereof.

As the rigid assembly consisting of tubes 8 and 14 are fixed to the car frame the greater the load carried by the car, the smaller the distance between the frame and ground, and therefore the greater the pressure exerted upon the spring 16; thus, a greater load is applied on wheel 1 and tire 2. The flexibility of spring 16 is so calculated that a constant ratio is obtained between the loads supported by the car wheels and wheel 1, 2, respectively.

In the central bore of cap 17 is fitted a self-lubricating ring 27 through which extends a shaft 28 provided with a bearing flange 29 having fixed thereon a drum 30. Shaft 28 is held at its upper portion by a bearing 31 of self-lubricating material, located in the upper casing 32 of the device (Fig. 1).

On the other hand said casing 32 houses a direct-current motor having an armature 33 mounted on shaft 28 and field windings 34 fixed to said casing 32 secured in turn through any suitable means to the flanged sleeve member 19.

Drum 30 is connected through a spiral spring 35 to the upper end of tube 14 through cap 17. Thus, when rotor 33 is rotated in the winding direction of spring 35, tube 14 and therefore the movable assembly of the apparatus are subjected to a torque such as to cause the wheel plane to rotate through an angle α in relation to the direction of travel of the car. Furthermore, drum 30 may be held in a predetermined position by actuating a brake band 36 controlled by an electromagnet 37.

The apparatus further comprises an electric contact-finger 38 rigidly connected to tube 14 through cap 17, an electric contact-finger 39 resiliently fixed to casing 32 and an electric contact-finger 40 rigidly fixed to said casing 32 (Figs. 1, 3, 9 and 10).

Figure 9:
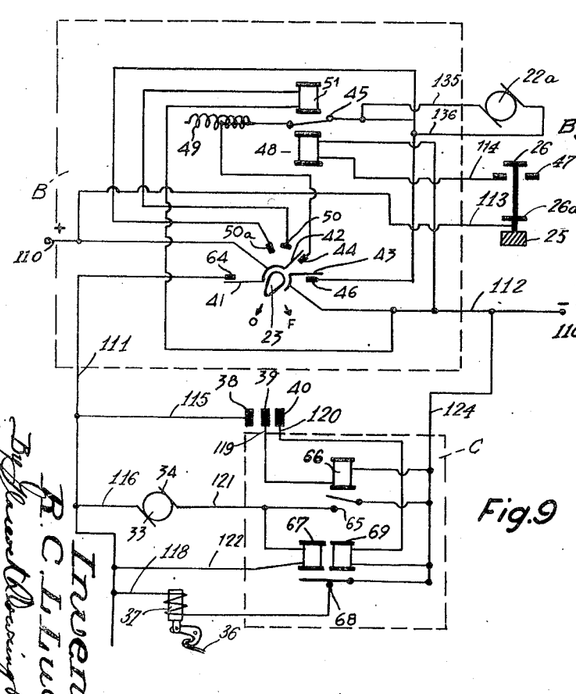
Figs. 9 and 10 illustrate the wiring diagram of the electric circuits provided for actuating the apparatus, in the case of a reversible and irreversible pump, respectively.

Fig. 9 illustrates the wiring diagram of the electrical circuit of the apparatus in case pump 22 is of the reversible type. The general control knob 23 is provided with three sliding contacts 41, 42 and 43 of which contacts 41, 42 are interconnected.

When the apparatus is started, i. e. after the control knob has been moved from position F to position O, the circuit connections are such that the pump-driving motor 22a is energized from the positive terminal of the battery through sliding contact 42, contact stud 44, closed contact 45, motor 22a, contact stud 46, sliding contact 43 and negative terminal of the battery.

Pump 22 is arranged to draw oil from reservoir 24 and deliver it into the telescopic tube members in order to put the apparatus in operative condition. The amount of oil Q to be introduced into the tube assembly should be determined beforehand according to the type of car equipped. This is achieved by providing in each reservoir 24 a floating piston 25 carrying a contact member 26. When the oil level in the reservoir reaches the predetermined limit corresponding to the delivery of this amount Q of oil, contact 26 engages contact 47 thereby energizing a winding 48 to open contact 45. The latter is constantly urged in its closed position by an overcentre spring 49.

Conversely, pump 22 may draw oil from cavity A for delivering it to reservoir 24.

When the control knob 23 is moved back to its original position F, sliding contact 42 firstly engages contact stud 50 and causes winding 51 to be energized. Thus, contact 45 is closed and overcentre spring 49 holds this contact in its closed position. Then, on reaching position F the motor 22a is reenergized but current flows thereto in the reverse direction through a circuit-positive terminal, sliding contact 42, contact stud 50a, motor 22a, contact 45, contact stud 44, sliding contact 43 and negative terminal. As the motor rotates in the opposite direction pump 22 will deliver oil into reservoir 24.

When the amount of oil Q corresponding to that required for putting the apparatus in operation is transferred contact member 26a carried by the floating piston 25 engages contact 47 and winding 48 will be energized thereby opening contact 45 and the energizing circuit of motor 22a.

Figures 6, 7, 11:
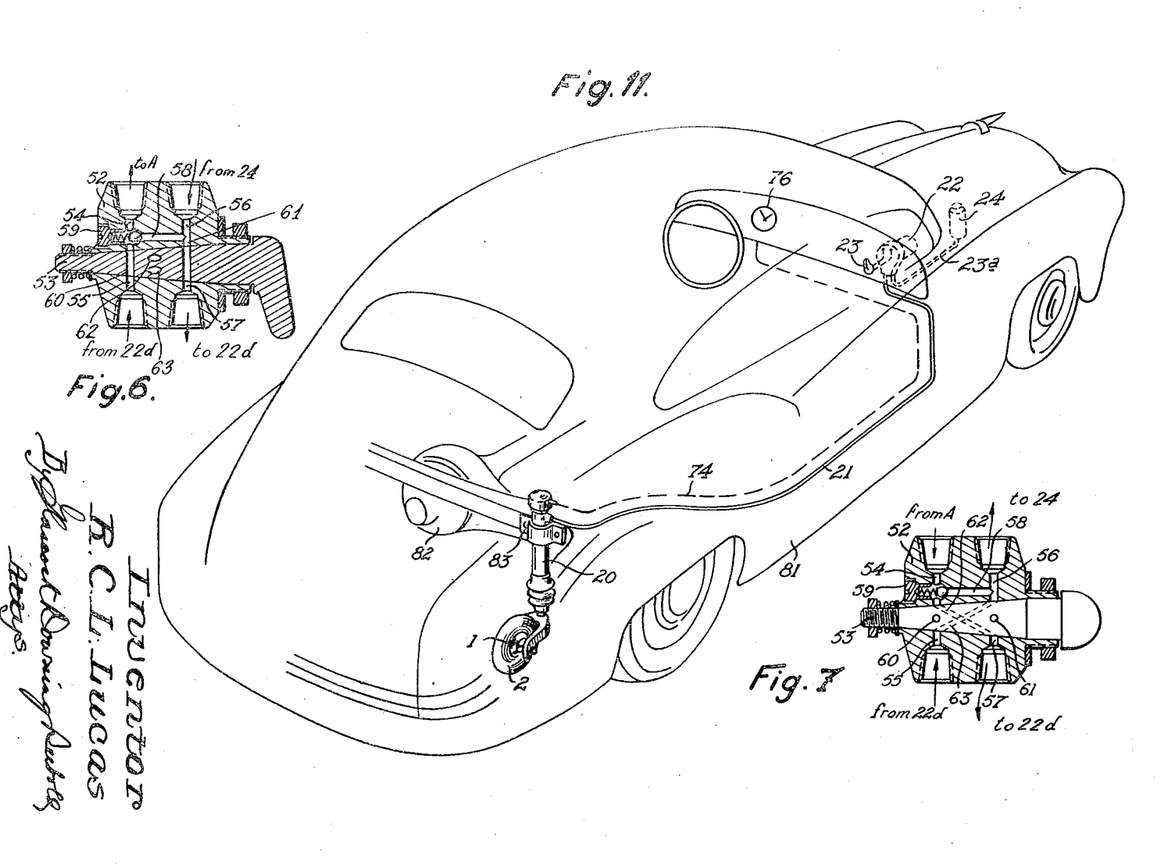
Figs. 6 and 7 are axial sections of a hydraulic circuit reversing device in its two operative positions, respectively.
Fig. 11 is a perspective view illustrating the mounting of the adhesion indicator according to the invention on a passenger car.
Figure 8:
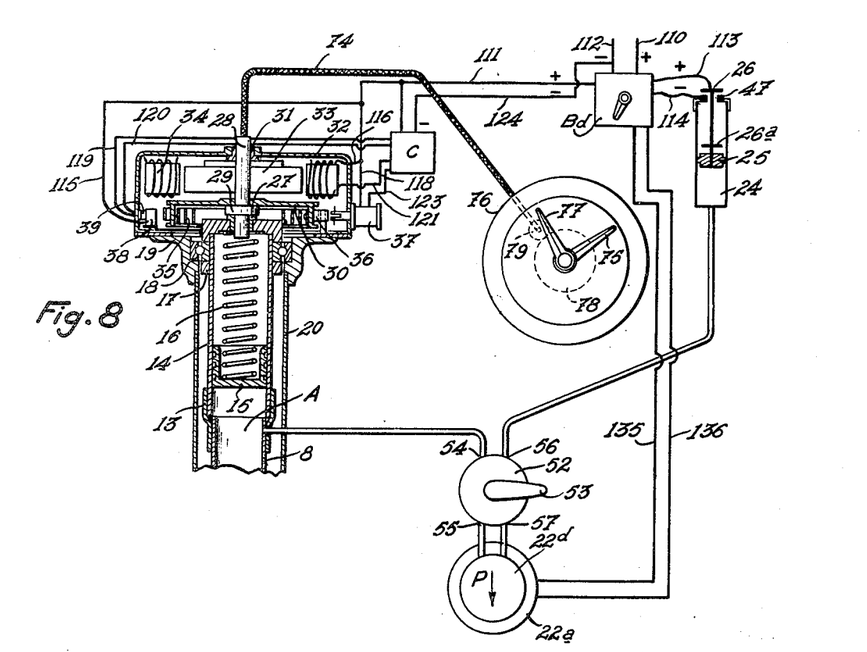
Fig. 8 illustrates the application of the reversing device illustrated in Figs. 6 and 7 to the adhesion indicator illustrated in Fig. 1.

In the case where an irreversible pump is used the driving motor thereof rotates always in the same direction and the general control knob 23d (Figs. 8 and 10) is connected with an oil circuit reversing device of the type illustrated in Figs. 6 and 7. This reversing device comprises a barrel 52 formed with a central plug bore in which a tapered plug 53 is tightly yet movably fitted for rotation about its axis. Moreover, barrel 52 is formed with four pipe-connecting screw-threaded tapered bores connected through four passages 54, 55, 56 and 57 with the aforesaid plug bore. Passage 54 is connected to the chamber A of the apparatus, passage 55 coaxial with passage 54 is connected to the delivery side of pump 22d, passage 56 is connected to reservoir 24 and passage 57 coaxial with passage 56 is connected to the intake side of the pump (Fig. 8). Passages 54, 56 are interconnected through a further passage 58 in which is located a safety valve 59. Tapered plug 53 is formed with a pair of parallel transverse bores 60, 61 having the same interaxial distance as passages 54, 56, and a pair of intersecting passages 62, 63 opening in passages 54, 57 on the one hand, and 55, 56, on the other hand. Thus, when the plug of the reversing device is moved to the position in which the cavity A of the apparatus is filled with pressure oil, the following hydraulic circuit is established (Fig. 6)—reservoir 24, passage 56, passage 61, passage 57, pump 22d, passage 55, passage 60, passage 54 and cavity A; when the plug is moved to its other or emptying position the following hydraulic circuit is obtained (Fig. 7)—cavity A, passage 54, passage 62, passage 57, pump 22d, passage 55, passage 63, passage 56 and reservoir 24.

Figure 10:
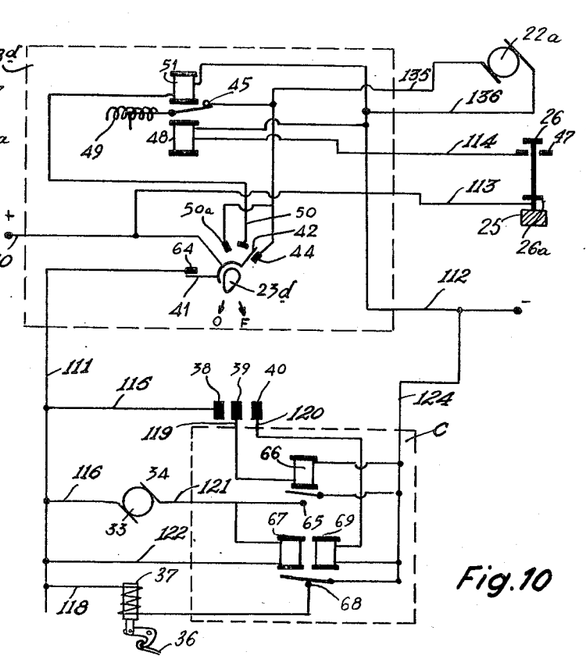

In this case the electric circuit illustrated in Fig. 9 is slightly simplified as shown in Fig. 10. The motor terminal opposite to that connected with contact 45 is permanently connected to the negative terminal of the battery while contact stud 46 and sliding contact 43 are dispensed with. Both contact studs 50a and 44 are connnected to the positive terminal of motor 22a. The rest of the circuit is unchanged and its operation requires no further explanations.

Figs. 9, 10 illustrate in their lower portions the electric circuit provided for controlling the adhesion indicator proper, which operates as follows:

When the apparatus is switched to its operative condition, i. e. when knob 23 is moved to position O, current is fed to field windings 34 from the positive battery terminal through sliding contact 41, contact stud 64, field windings 34, closed main contact 65 and the negative battery terminal. At the same time the electromagnet winding 67 is energized and opens the auxiliary contact 68, thus opening the energizing circuit to electromagnet 37 and causing the brake band 36 to be released from drum 30. The armature 33 is rotated by field windings 34 and winds up the spiral spring 35 whereby wheel 1 will assume a given angular position in relation to the direction of travel. When this angular displacement of wheel 1 has reached a predetermined value α, contact finger 38 engages the fixed yet resilient contact finger 39 and as a result current flows through the electromagnet winding 66 which opens main contact 65; therefore the motor field windings 34 are de-energized. At the same time, electromagnet winding 67 is de-energized and auxiliary contact 68 is closed to energize the winding of the brake band operating electromagnet 37 and hold drum 30 and therefore armature 33 against motion.

If a good road adhesion is prevailing the spring 35 will be wound to a relatively high degree thereby moving the wheel 1 to an angular position corresponding to the aforesaid angle α and rotating the armature 33 through a very wide angle, whilst bad adhesion requires but a small angular displacement of armature 33 to bring the wheel 1 in the desired position.

If at a given moment the adhesion of wheel 1 improves, the tension exerted by spring 35 on tube 14 will be insufficient and the wheel will move closer to the direction of travel of the vehicle.

As a consequence of this modified position of wheel 1 contact finger 38 will be moved away from contact finger 39 and electromagnet winding 66 de-energized. The main contact 65 closes and field windings 34 are re-energized. At the same time, electromagnet winding 67 is energized and opens contact 68 so that the electromagnet 37 becomes inoperative. The brake band 36 is released from drum 30 and immediately afterwards armature 33 begins to rotate in order to restore the wheel 1 to the desired position.

Conversely, if adhesion is decreasing the tension exerted by spring 35 on tube 14 will be too strong whereby the wheel will tend to deviate from the direction of travel of the vehicle.

Figure 5:
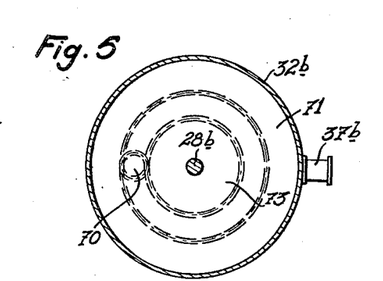
Fig. 5 is a section of Fig. 4 taken along line V—V.

The rigid contact finger 38 engages contact finger 39 until it engages the other rigid contact finger 40. Thus, electromagnet winding 69 will be energized in turn and auxiliary contact 68 is open in order to de-energize the electromagnet winding 37 and release the brake band 36 from the drum. The spiral spring may therefore expand and cause drum 30 and armature 33 to move back. Thus the wheel is restored to a correct position while contact fingers 38 and 40 are separated from each other and the brake band 36 is again tightened around drum 30. Now if it becomes desirable to reduce the speed of rotation of drum 30 the latter may be driven in the way illustrated in Figs. 4 and 5 which is similar to the upper portion of Fig. 1 and wherein similar parts are designated by the same reference numbers with the additional letter b. A self-lubricating ring member 27b is fitted in the central bore of cap member 17b and engaged by the bottom end of a shaft 28b formed with a bearing collar portion 29b. On this shaft 28b is mounted for loose rotation a drum 30b carrying loose planet pinions 70 meshing with an internally toothed gear ring 71 fast with the upper casing 32b and a sun gear 73 carried by the shaft 28b. This shaft has its upper end held in the upper casing 32b by a self-lubricating bearing 31b and carries the rotor 33b.

On the other hand, the rotor shaft 28 (Fig. 1) or 28b (Fig. 4) is connected through a sheathed cable 74 to a pointer 75 centred on the speedometer 76 of the vehicle, a suitable reduction ratio being provided between the speed of rotation of shaft 28 and that of pointer 75 by means of reducing gears 77 and 78.

When the adhesion indicator is inoperative the pointer 75 is on the zero position.

When the adhesion indicator is operative, if the adhesion is poor armature 33 and therefore pointer 75 will be rotated through a small angle; for instance, it may indicate the Figure 50 on the speedometer. Conversely, if the road surface and condition offer a good grip to the wheels of the vehicle, armature 33 will be rotated through a greater angle together with pointer 75 which may indicate, for instance, 90 on the speedometer.

Thus a mere glimpse at the speedometer will enable the driver to know the margin of safety available by observing the angular gap between the actual speedometer pointer 79 and the pointer 75 of the adhesion indicator.

In order to prevent mud or dust likely to be detrimental to the operation of the apparatus from accumulating on the lower telescopic portion thereof a pleated sleeve 80 of flexible material, for instance natural or synthetic rubber, is fixed on the lower casing or body 20 and fork 3.

Electromagnets 48 and 51, contact 45, and the various sliding contacts and contact studs controlled by knob 23 are housed within a box B from which issue wires 110, 111, 112, 113, 114, 135 and 136. Electromagnets 66, 67 and 69, main contact 65 and auxiliary contact 68 are housed within a box C from which issue wires 119 to 124. Contact member 38, motor 34 and electromagnet 37 are respectively connected to wire 111 through lines 115 to 118 (Figs. 1, 9 and 10).

As illustrated in Fig. 11 the adhesion indicator is fixed by means of its body 29 to the frame of a vehicle, in this example a passenger car 81, in the vicinity of the rear axle 82 and with the assistance of a suitable fish-plate 83. The object of this particular mounting is to render the predetermined angle α substantially insensitive to the shape of the travel line of the vehicle. In particular in a curve, the rear vehicle axle passing through the instantaneous center of gyration of the vehicle, the contact point of tire 2 with road substantially describes a circle centered on said gyration center, whereby the plane of wheel 1 remains very close to the position which it occupies when the vehicle travels straight ahead. In carrying out the invention on practical lines it will be advisable on safety grounds to restrict the measuring to the zone which precedes pure skidding effect. As, on the other hand, the dimensions of tire 2 are smaller than standard automobile tires so that the tire "offset" effect is reduced accordingly, the angle α should preferably have a value close to 6°–7°.

Figure 14:
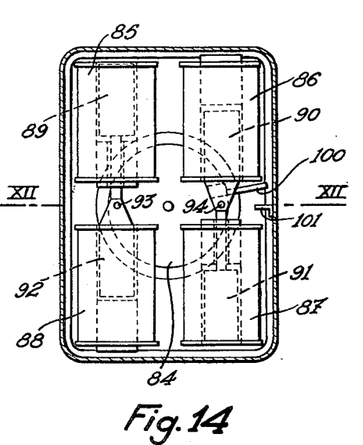
Fig. 14 is a section of Fig. 12 taken along line XIV—XIV before the tire skids.
Figure 15:
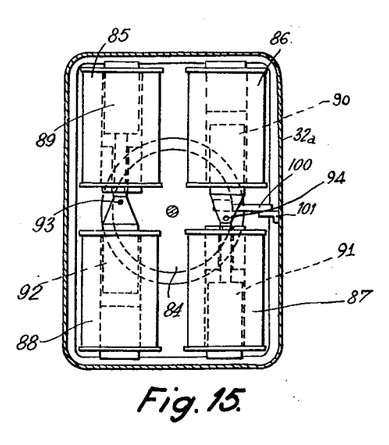
Fig. 15 is a view similar to Fig. 14 after the tire skids.

According to a further embodiment of this invention the adhesion indicator, instead of enabling the driver to estimate his margin of safety in accordance with his travelling speed, may warn him of the precise moment in which a skid is likely to begin. A device of this kind is illustrated in Figs. 12, 14 and 15 of the drawings wherein all parts similar to those shown in Figs. 1–8 are designated by the same reference numbers to which the latter $a$ is added.

The adhesion indicator illustrated in axial section in Fig. 12 is provided with a feeler assembly similar to that shown in Fig. 1 so that any description thereof would be superfluous, the same applying on the other hand to the hydraulic control device therefor.

On the flanged sleeve member 19a is fixed a casing 32a within which are secured, on either sides of rectangular diameters, four electromagnets 85, 86, 87 and 88. The cores 89, 90, 91 and 92 of these electromagnets are so disposed that when energized cores 89, 91 will pull on a pair of pins 93, 94 fast with a plate 84 fixed on the top surface of cap member 17a whilst cores 90, 92 will push these pins (Figs. 14 and 15). The windings 95, 96, 97 and 98 of these electromagnets are series parallel connected to an electric generator 99 rotating at a speed varying with the speed of the vehicle, for instance the generator normally fitted on the vehicle for lighting and battery charging purposes.

Besides, plate 84 is provided with a contact 100 adapted to engage a fixed contact 101 carried by the upper casing 32a of the apparatus when plate 84 has been displaced angularly from a predetermined position, for instance wherein wheel 1 is parallel to the direction of travel of the vehicle.

When contact 100 engages contact 101 it closes an electric circuit connected to an optical or sound warning signal 103.

Figure 16:
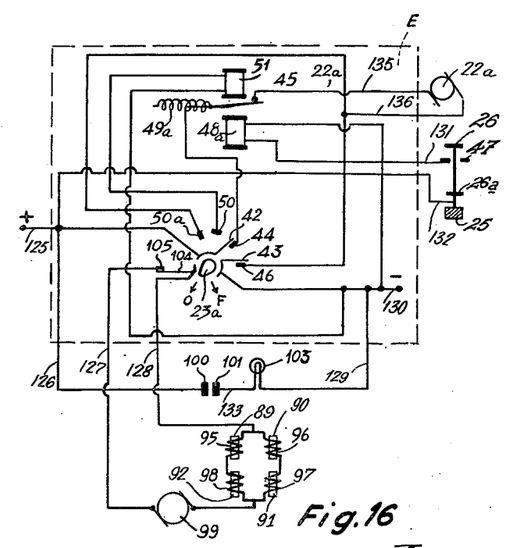
Fig. 16 is the wiring diagram of the electric circuit for actuating the apparatus illustrated in Fig. 12 in case a reversible pump is used for the hydraulic circuit.

Fig. 16 illustrates in its lower portion the electric control circuit of the adhesion indicator shown in Fig. 12. This circuit operates as follows:

When the apparatus is put in its operative condition the control knob 23a closes the energizing circuit for electromagnet windings 95 to 98 through engagement of contact members 104, 105. When the car is in motion the generator 99 of the lighting and ignition system thereof energizes these electromagnet windings 95 to 98. Windings 95 to 98 will attract cores 89 to 92 respectively with a force varying in proportion with the car speed. As these cores are operatively connected with pins 93 and 94 they will apply through the medium of plate 84 a torque to the telescopic assembly 14a, 8a, 7a and 6a which will also vary with the travel speed and tend to rotate wheel 1a about the axis of this telescopic asembly through the lever arm formed by fork 3a. As long as wheel 1a adheres sufficiently to the road surface this will prevent the aforesaid pivotal effect (Fig. 14), but when low adhesion conditions prevail, notably when the car speed tends to rise towards a given value or if the car is insufficiently loaded, wheel 1a will skid and yield to this torsion torque. Then the diametral pin line 93—94 will tend to take the slightly inclined position shown in Fig. 15. A slight angular displacement of plate 84 will cause contact finger 100 to engage contact finger 101 and therefore the circuit for feeding the warning signal 103 with current will be closed and the driver warned that the car speed is to be reduced. Although the warning signal 103 is a lamp in Fig. 16 of the drawings, it will be readily understood by those conversant with the art that any desired type of visual and/or audible signal may be used for this purpose.

Electromagnets 48 and 51, contact 45, and the various sliding contacts and contact studs controlled by knob 23 are housed within a box E from which issue wires 125 to 132, 135 and 136. Warning device 103 is connected to contact 101 through wire 133, while generator 99 is connected to the series parallel electromagnets through wire 134 (Figs. 12 and 16).

While I have herein shown and described some forms in which my invention may be embodied, it will be understood that the construction thereof and the arrangement of the various parts may be altered without departing from the spirit and scope thereof. Furthermore, I do not wish to be construed as limiting my invention to the specific embodiments illustrated, excepting as may be limited in the appended claims.

What I claim is:

1. In an adhesion indicator for automotive vehicles of the type comprising a hollow vertical body fixed to the frame of the vehicle, a vertical supporting member adapted to pivotally move about the vertical axis of said hollow body, a radially mounted arm at the lower end of said supporting member and a rolling member rotatably carried by the outer end of said arm and adapted to engage the road surface on which said vehicle is travelling, in combination, a vertical supporting member comprising a series of telescopic interfitting tubes, the lower part of the tube having the smallest diameter being connected to the radially-mounted arm whilst the upper portion of the tube having the largest diameter is cylindrical, packing rings respectively interposed between said telescopic interfitting tubes, bearing means positioned between said large-diameter tube and the vertical hollow body, a piston reciprocably movable in the cylindrical part of said large-diameter tube, a cap member for closing the upper portion of said large-diameter tube, a coil spring placed between said piston and said cap member, means for filling the telescopic cavity formed by said telescopic tubes and said piston with an amount of fluid the value of which is predetermined according to the type of automotive vehicle equipped with the adhesion indicator for developing the telescopic interfitting tubes and compressing the coil spring with a view to apply the rolling member against the road surface with a force in proportion with the load carried by the wheels of said vehicle, said filling means acting also as draining means for retracting said adhesion indicator when inoperative, a torque generator carried by the hollow vertical body and connected with said supporting member for applying to said last member and to the rolling member a torque about the pivotal axis of said supporting member, and means for determining the road adhesion conditions of the vehicle from the variation in the angular position of said rolling member with respect to the travel direction of the vehicle from a predetermined position while said member is submitted to the action of said torque generator.

2. An adhesion indicator for automotive vehicles, according to claim 1, wherein the means for filling and draining the telescopic cavity comprise a reversible pump connected to an orifice formed in the large-diameter tube, a fluid reservoir connected to said reversible pump, a reversible motor connected with said reversible pump for driving the same, means for rotating said motor in both directions, means for stopping said motor rotating in the direction for which the pump fills the telescopic cavity with fluid as soon as the amount of fluid drawn by the pump from said reservoir reaches a predetermined value, and means for stopping said motor rotating in the reverse direction for which the pump drains the telescopic cavity as soon as the amount of fluid directed by the pump to said reservoir reaches a predetermined value.

3. An adhesion indicator for automotive vehicles, according to claim 2, wherein the reversible motor is an electric motor and wherein the motor stopping means comprises a floating piston movable in the reservoir, a pair of spaced electric contact members fast with said floating piston, a motor-actuating electric circuit having a main contact normally closed when said motor is put under tension, a stopping electric circuit having a winding adapted to open said main contact when energized, and a closing contact inserted in series in said stopping electric circuit and placed between said contact members in order to open said motor-actuating circuit when either of said contact members engages said closing contact whereby said winding is energized.

4. An adhesion indicator for automotive vehicles, according to claim 1, wherein the means for filling and draining the telescopic cavity comprise an irreversible pump connected to an orifice formed in the large-diameter tube, a fluid reservoir connected to said irreversible pump, a motor connected with said pump for driving the same, means for rotating said motor, means for modifying the fluid circuit between the telescopic cavity and the reservoir for allowing either the filling or the draining of said cavity, means for stopping said motor when the fluid circuit allows the pump to fill the telescopic cavity as soon as the amount of fluid drawn by said pump from said reservoir reaches a predetermined value, and means for stopping said motor when the modified fluid circuit allows the pump to drain said telescopic cavity as soon as the amount of fluid directed by said pump to the reservoir reaches a predetermined value.

5. An adhesion indicator for automtive vehicles, according to claim 4, wherein the motor is an electric motor and wherein the motor stopping means comprises a floating piston movable in the reservoir, a pair of spaced electric contact members fast with said floating piston, a motor-actuating electric circuit having a main contact normally closed when said motor is put under tension, a stopping electric circuit having a winding adapted to open said main contact when energized, and a closing contact inserted in series in said stopping circuit and positioned between said contact members in order to open said motor-actuating circuit when either of said contact members engages said closing contact whereby said winding is energized.

6. An adhesion indicator for automotive vehicles, according to claim 1, wherein the means for filling and draining the telescopic cavity comprise an irreversible pump having an inlet and an outlet, a fluid reservoir, a motor connected to said pump for driving the same, means for rotating said motor, a barrel formed with a central plug bore and with four connecting radial passages opening in said plug bore and communicating with the telescopic cavity through an orifice formed in the large-diameter tube, the outlet of the pump, the reservoir and the inlet of said pump, respectively, a pivotable plug housed in said plug bore and formed with a first pair of bores which, for a first position of the pivotable plug, respectively connect the telescopic cavity passage with the pump outlet passage and the reservoir passage with the pump inlet passage, said plug being also formed with a second pair of bores which, for a second position of the pivotable plug, respectively connect the telescopic cavity passage with the pump inlet passage and the reservoir passage with the pump outlet passage, means for pivoting said pivotable plug, means for stopping said motor when the pivotable plug is set in the first position as soon as the amount of fluid drawn by the pump from said reservoir reaches a predetermined value, and means for stopping said motor when the pivotable plug is set in the second position as soon as the amount of fluid directed by the pump to said reservoir reaches a predetermined value.

7. An adhesion indicator for automotive vehicles, according to claim 1, wherein the telescopic tubes have an elliptic cross-sectional profile and the uppermost tube is fast with the cylindrical tube.

8. An adhesion indicator for automotive vehicles, according to claim 1, wherein the flexibility of the coil spring is so calculated that the loads supported by the rolling member and by the tires of the vehicle, respectively, are kept to a constant ratio.

9. An adhesion indicator for automotive vehicles, according to claim 1, wherein the means for determining the road adhesion conditions comprises means for moving the rolling member set in operative position to a predetermined angular position with respect to the direction of travel of the vehicle under the action of the torque generator which then generates a torque the value of which depends on the actual road adhesion, means for varying the value of said torque to restore said rolling member to said predetermined angular position when deviated therefrom in consequence of a variation in the road adhesion with respect to the initial road adhesion, and means for indicating the value of the torque variation as a function of the variation in the angular position of said rolling member from said predetermined angular position.

10. An adhesion indicator for automotive vehicles, according to claim 1, wherein the torque generator and the means for determining the road adhesion conditions comprise a direct-current motor having field windings fast with the hollow vertical body, a shaft journaled for rotation in the cap member closing the telescopic cavity and an armature keyed on said shaft, a line connecting said motor with the direct current source of the vehicle and having a main contact, resilient means connecting said armature and the supporting member, means for locking said armature in rotation, means for closing said contact when the road adhesion is to be determined, the rolling member being set in operative position, whereby said rolling member is driven in rotary movement about the pivotal axis of the supporting member while said resilient connecting means is tensioned, means for actuating said locking device as soon as said rolling member reaches a predetermined angular position with respect to the direction of travel of the vehicle and for simultaneously opening said main contact, means for unlocking said locking means and for simultaneously closing said main contact when the angular position of said rolling member comes nearer to said direction of travel due to an improvement of the road adhesion to restore said rolling member to said predetermined angular position by the subsequent rotation of said armature and tensioning of said resilient means, means for unlocking said locking means when the angular position of said rolling member deviates from said predetermined angular position for departing from said direction of travel due to a decreasing of the road adhesion with a view to restore said rolling member in said predetermined angular position by the release of said resilient connecting means, and means for indicating the value of the variation in the tension applied to said resilient connecting means as a function of the variation in the angular position of said rolling member from said predetermined angular position.

11. An adhesion indicator for automotive vehicles, according to claim 10, wherein the means indicating the tension variation comprises a flexible cable connected to the shaft of the motor, a pinion drive mounted on the speedometer of the vehicle and comprising a driving pinion connected to said flexible cable and a driven pinion centered on the pointer shaft of said speedometer, and an adhesion indicator pointer fast with said driven pinion.

12. An adhesion indicator for automotive vehicles, according to claim 10, wherein the locking, unlocking and resilient connecting means comprise a brake drum secured on the motor shaft, a spiral spring the ends of which are respectively connected with said drum and with the cap member closing the telescopic cavity, a brake band surrounding said drum, a first electromagnet adapted to tighten said brake band around said drum when energized, an electromagnet-actuating line having an auxiliary contact and connecting said first electromagnet with the current source, a second electromagnet adapted to open said auxiliary contact and mounted in parallel with the motor, a third electromagnet adapted to open said auxiliary contact when energized and connected with one pole of the current source, a fourth electromagnet adapted to open the main contact when energized and connected with the same pole of the current source, a first contact finger rigidly connected to the large-diameter tube and connected with the other pole of the current source, a second contact finger fast with the hollow vertical body and connected with the third electromagnet, and a third contact finger resiliently mounted with respect to said hollow vertical body and connected with said fourth electromagnet, said third contact finger being inserted between said first and second contact fingers without contacting the same when the rolling member is parallel to the direction of travel of the vehicle.

13. An adhesion indicator for automotive vehicles, according to claim 10, wherein the locking, unlocking and resilient connecting means comprise a brake drum mounted for loose rotation on the motor shaft, planet pinions journaled in said drum, a sun gear fast with and concentric to said shaft while meshing with said planet pinions, an internally toothed gear ring fast with the hollow vertical body and meshing with said planet pinions, a spiral spring the ends of which are respectively connected with said drum and with the cap member closing the telescopic cavity, a brake band surrounding said drum, a first electromagnet adapted to tighten said brake band around said drum when energized, an electromagnet-actuating line having an auxiliary contact and connecting said first electromagnet with the current source, a second electromagnet adapted to open said auxiliary contact and mounted in parallel with the motor, a third electromagnet adapted to open said auxiliary contact when energized and connected with one pole of the current source, a fourth electromagnet adapted to open the main contact when energized and connected with the same pole of the current source, a first contact finger rigidly connected to the large-diameter tube and connected with the other pole of the current source, a second contact finger fast with the hollow vertical body and connected with the third electromagnet, and a third contact finger resiliently mounted with respect to said hollow vertical body and connected with said fourth electromagnet, said third contact finger being inserted between said first and second contact fingers without contacting the same when the rolling member is parallel to the direction of travel of the vehicle.

14. An adhesion indicator for automotive vehicles, according to claim 1, wherein the means for determining the road adhesion conditions comprises means for varying the torque generated by the torque generator in direct ratio with the vehicle speed, the rolling member being parallel to the direction of travel of the vehicle, and warning means connected with the support member and operated thereby as soon as said rolling member tends to assume an angular position with respect to said direction of travel under the action of said variable torque, whereby prevailing low adhesion conditions are indicated.

15. An adhesion indicator for automotive vehicles, according to claim 1, wherein the torque generator and the means for determining the road adhesion conditions comprise four series parallel connected electromagnets fast with the hollow vertical body and disposed symmetrically with respect to two rectangular planes passing through the pivotal axis of the supporting member, the cores of said electromagnets being aligned two by two along two tangents of a common circle and moving in the same circular direction when said electromagnets are simultaneously energized, means for connecting the two pairs of aligned cores with said supporting member, a first electric circuit connected to the generator of the vehicle and to said electromagnets, whereby the energization of said electromagnets and therefore the resulting torque applied to said supporting member varies in direct ratio with the travelling speed of the vehicle, a second electric circuit connected to said generator, a warning device inserted in said second circuit, and a contact finger fast with said supporting member and adapted to close said second circuit when the rolling member is caused by the influence of the variable torque applied to said supporting member to move angularly about the pivotal axis of said supporting member from a position parallel with the line of travel of the vehicle.

References Cited in the file of this patent

UNITED STATES PATENTS

| Number | Name | Date |
|---|---|---|
| 2,269,305 | Bell | Jan. 6, 1942 |
| 2,290,618 | Bosomworth | July 21, 1942 |
| 2,441,993 | Dasher | May 25, 1948 |
| 2,496,405 | Foufounis | Feb. 7, 1950 |